(12) United States Patent
Takata

(10) Patent No.: US 7,719,630 B2
(45) Date of Patent: May 18, 2010

(54) ILLUMINATION APPARATUS FOR DISPLAY DEVICE, DISPLAY DEVICE USING THE SAME, AND TELEVISION RECEIVER APPARATUS COMPRISING THE DISPLAY DEVICE

(75) Inventor: Yoshiki Takata, Suzuka (JP)

(73) Assignee: Sharp Kabushiki Kaisha, Osaka (JP)

(*) Notice: Subject to any disclaimer, the term of this patent is extended or adjusted under 35 U.S.C. 154(b) by 0 days.

(21) Appl. No.: 12/565,979

(22) Filed: Sep. 24, 2009

(65) Prior Publication Data

US 2010/0008069 A1     Jan. 14, 2010

Related U.S. Application Data

(63) Continuation of application No. 12/014,118, filed on Jan. 15, 2008, now Pat. No. 7,616,269, which is a continuation of application No. PCT/JP2006/311765, filed on Jun. 12, 2006.

(30) Foreign Application Priority Data

Aug. 30, 2005   (JP) .............................. 2005-249278

(51) Int. Cl.
  *G02F 1/1333*   (2006.01)
  *G02D 11/28*   (2006.01)
(52) U.S. Cl. ............................. 349/58; 349/56; 349/62; 362/280
(58) Field of Classification Search ....................... None
See application file for complete search history.

(56) References Cited

U.S. PATENT DOCUMENTS 7,538,759 B2 *  5/2009  Newton ....................... 345/173
2004/0252252 A1  12/2004  Lee et al.

FOREIGN PATENT DOCUMENTS

| JP | 06-300924 A | 10/1994 |
|---|---|---|
| JP | 08-278414 A | 10/1996 |
| JP | 2000-011728 A | 1/2000 |
| JP | 2002-022910 A | 1/2002 |
| JP | 2004-125964 A | 4/2004 |
| JP | 2005-004200 A | 1/2005 |

OTHER PUBLICATIONS

Takata; "Illumination Apparatus for Display Device, Display Device Using the Same, and Television Receiver Apparatus Comprising the Display Device"; U.S. Appl. No. 12/014,118, filed Jan. 15, 2008.

* cited by examiner

*Primary Examiner*—Tina M Wong
(74) *Attorney, Agent, or Firm*—Keating & Bennett, LLP

(57) ABSTRACT

In a backlight apparatus, laminated optical sheets are housed in a tray such that a wall portion thereof surrounds their circumferences so that the optical sheets receive light from fluorescent lights. Tips of one corner portion A of optical sheets preferably have a shape in which the tips are trimmed by line segments extending between two edges defining the corner portions. At the wall portion of the tray, an opposing surface is formed along the line segments of the corner portions so as to correspond to the shape of the corner portions having tips trimmed off. The opposing surface restrains the line segments.

6 Claims, 18 Drawing Sheets

ILLUMINATION APPARATUS FOR DISPLAY DEVICE, DISPLAY DEVICE USING THE SAME, AND TELEVISION RECEIVER APPARATUS COMPRISING THE DISPLAY DEVICE

BACKGROUND OF THE INVENTION

1. Field of the Invention

The present invention relates to an illumination apparatus for a display device used in a liquid crystal panel or the like, a display device including the same, and a television receiver apparatus including the display device.

2. Description of the Related Art

Japanese Patent Laid-Open No. 2000-11728 (FIG. 1) describes a conventional device relating to a backlight apparatus for a liquid crystal display device. In that device, a plurality of optical sheets are laminated and disposed so as to face a light source housing portion, such that light emitted from the light source is uniformly radiated onto a display by the optical sheets.

In some cases, optical sheets that have directionality with respect to the top and bottom surfaces are included among the plurality of optical sheets. If an optical sheet of this kind is mistakenly disposed with the top and bottom surfaces on the opposite sides, correct illumination cannot be performed for the display and a display device that uses that illumination apparatus will be unable to properly display an image.

According to the prior art as described in Japanese Patent Laid-Open No. 2000-11728, an ear portion is caused to protrude from one edge of each optical sheet, and the ear portions are formed at respectively different positions among the optical sheets. Therefore, since the positions of the ear portions will be irregular when any of the optical sheets are mistakenly disposed with their top and bottom surfaces inverted, it is possible to easily discover that the top and bottom surfaces are mistakenly disposed.

However, according to the above described prior art, because the ear portions protrude from the optical sheets, the size of a housing that stores the optical sheets is increased by the size of the ear portions and the size of the overall illumination apparatus thus increases. In order to reduce the size of the apparatus, it is necessary to reduce the external shape of the optical sheets, but if the optical sheets are provided with the ear portions as they are, the active area of the optical sheets will be decreased.

SUMMARY OF THE INVENTION

In order to overcome the problems described above, preferred embodiments of the present invention provide an illumination apparatus for a display device that makes it possible to easily discover when the top and bottom surfaces of optical sheets are disposed in an inverted state, and also has a small size, as well as a display device that includes such an illumination apparatus, and a television receiver apparatus including such a display device.

According to a preferred embodiment of the present invention, an illumination apparatus for a display device includes an optical sheet having a plurality of corner portions and housed in a housing in a condition such that a wall portion thereof surrounds the circumference of the optical sheet so that the optical sheet receives light from a light source in the housing, wherein a tip of at least one of the corner portions of the optical sheet has a shape in which the tip is trimmed by a line segment extending between two edges that define the corner portion, at the wall portion of the housing an opposing surface is arranged along the line segment of the corner portion so as to correspond to the shape of the corner portion at which the tip is trimmed, and when the optical sheet is housed in the housing in a state in which the top surface and the bottom surface thereof are inverted, one of the other corner portions thereof is disposed at an area at which the opposing surface of the housing is provided and comes to a standstill on the opposing surface.

Thus, since one of the corner portions comes to a standstill on the opposing surface, it is possible to easily discover that the optical sheet is disposed in an upside-down condition. Further, since the configuration is one in which only the tip of a corner portion of the optical sheet is trimmed off, it is possible to make a small illumination apparatus without sacrificing the active area of the optical sheet.

In this connection, the aforementioned housing also includes a housing comprising a plurality of components that use a material such as metal or synthetic resin, and is not limited to a concept of only a housing formed with a single component.

The following configurations are preferable as various preferred embodiments of the present invention.

An illumination apparatus for a display device includes a plurality of optical sheets which are laminated and housed in a housing, tips of at least one corner portion of the optical sheets define a sheet inversion detection portion by being formed in a similar shape in which the tips are trimmed by the line segment so as to follow an opposing surface of the housing, at least one tip of the other corner portions has a shape in which the tip is trimmed by a second line segment that extends between two edges that define the corner portion such that these corner portions define a missing sheet detection portion by being stacked in order from the corner portion with the largest remaining area, and when the optical sheets are housed in the housing in a state in which the top surface and the bottom surface are inverted, the missing sheet detection portion is disposed at an area at which the opposing surface of the housing is provided and comes to a standstill on the opposing surface.

Therefore, the sheet inversion detection portion makes it easy to discover that an optical sheet is disposed in an upside-down condition, and the missing sheet detection portion makes it easy to discover that an optical sheet is missing among a plurality of optical sheets.

In this connection, the term "similar shape" described above refers to a shape that corresponds to the opposing surface of the housing, and is a concept that includes slight differences in shape and dimensions within the scope thereof.

Each of the optical sheets preferably has a substantially rectangular shape, a pair of the sheet inversion detection portions are provided at diagonally opposing corner portions of the optical sheets, and the missing sheet detection portion is provided at one of the remaining corner portions so that, by checking corner portions at a minimum of two adjacent positions, it is possible to discover that an optical sheet is disposed in an upside-down condition and, further, such a check can be easily carried out in a short time.

Each of the optical sheets preferably has a substantially rectangular shape, a pair of the missing sheet detection portions are provided at diagonally opposing corner portions of the optical sheets, and the sheet inversion detection portion is provided at one of the remaining corner portions so that, by checking corner portions at a minimum of two adjacent positions, it is possible to discover that there is a missing optical sheet and, further, such a check can be easily carried out in a short time.

Each of the optical sheets preferably has a substantially rectangular shape, a pair of the sheet inversion detection portions are provided at diagonally opposing corner portions of the optical sheets and a pair of the missing sheet detection portions are provided at the remaining corner portions so that, by checking corner portions at a minimum of two adjacent positions, it is possible to discover that an optical sheet is disposed in an upside-down condition or is missing and, further, these checks can be easily carried out in a short time.

Each of the optical sheets preferably has a substantially rectangular shape, and one sheet inversion detection portion and one missing sheet detection portion are provided at corner portions that oppose each other on a single diagonal line so that, when forming the optical sheets by cutting off corner portions of a sheet member that has a substantially rectangular shape, the cutting areas can be reduced to enable fabrication in a short time.

Each of the optical sheets preferably has a substantially rectangular shape, and missing sheet detection portions are provided at three corner portions among the four corner portions and a sheet inversion detection portion is provided at the remaining one corner portion so that detection of a missing optical sheet among the optical sheets can be surely carried out at the three missing sheet detection portions.

Each of the optical sheets preferably has a substantially rectangular shape, and sheet inversion detection portions are provided at three corner portions among the four corner portions and a missing sheet detection portion is provided at the remaining one corner portion so that it is possible to surely detect that an optical sheet is disposed in an upside-down condition at the three sheet inversion detection portions.

At the missing sheet detection portion, an optical sheet in which two edges that define a corner portion are joined by an arc so as to project outward, is stacked on an optical sheet in which two edges that define a corner portion are joined by a straight line and, further, an optical sheet in which the two edges that define a corner portion are joined by a straight line is stacked thereon and edge portions of the arc are at positions which are linked by the straight line of the optical sheet that is stacked thereon so that, even when three sheets are placed on top of each other, the arc and the straight line of the optical sheet stacked thereon do not overlap, and thus these can be clearly distinguished. Further, since the straight line of the optical sheet located at the uppermost layer is not provided in a condition in which it is separated from the arc and penetrates deeply towards the inner side, and the sectional width thereof does not become large, it is possible to make the illumination apparatus for a display device small and lightweight.

By forming an optical sheet by cutting off a corner portion of a sheet member that preferably has a substantially rectangular shape, a normal sheet member that has a substantially rectangular shape that is used for multiple purposes can be used as the raw material of the optical sheet, enabling provision of the optical sheet at a low cost.

By forming an optical sheet to have a shape in which a corner portion is trimmed off using a forming die, the optical sheet can be fabricated by only a forming process, without cutting or the like.

By disposing a display in front of the above described illumination apparatus for a display device, it is possible to make a small display device for which it is easy to discover that an optical sheet is disposed in an upside-down condition.

By adopting a configuration that includes the above described display device, it is possible to provide a small television receiver apparatus in which it is easy to discover that an optical sheet is disposed in an upside-down condition.

Since it is possible to easily discover that an optical sheet is disposed in an upside-down condition, the workability with respect to fabrication is improved and a low cost illumination apparatus for a display device can be provided.

Additional elements, characteristics, steps, features, and strengths of the present invention will be made clear by the description below. Further, the advantages of the present invention will be evident from the following explanation in reference to the drawings.

DETAILED DESCRIPTION OF THE PREFERRED EMBODIMENTS

Figure 1:
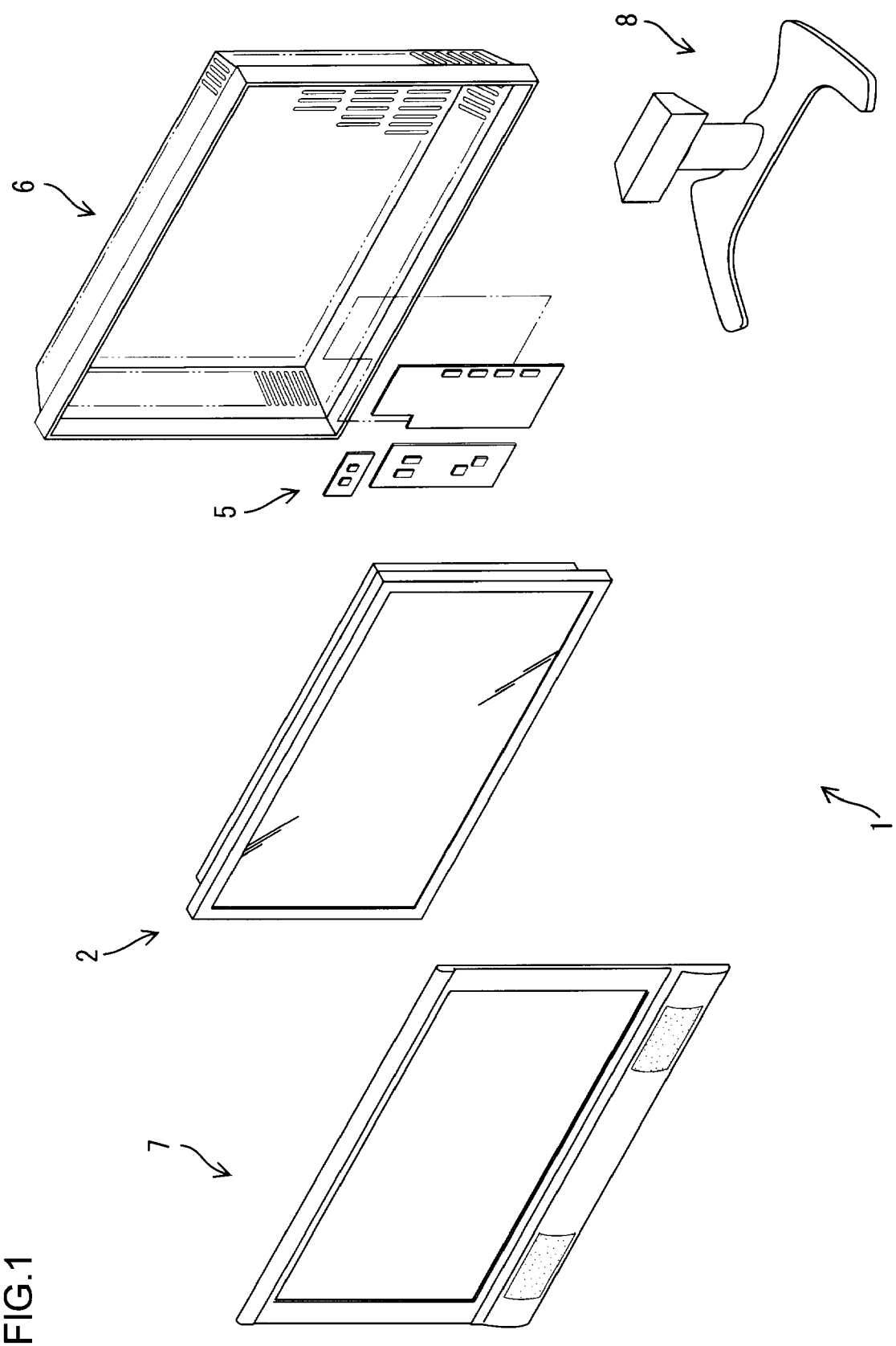
FIG. 1 is an exploded perspective view of a television receiver apparatus according to a preferred embodiment of the present invention.

A preferred embodiment of the present invention will now be described referring to FIG. 1 to FIG. 7. A television receiver apparatus 1 according to the present preferred embodiment preferably includes a liquid crystal display 2, a tuner circuit 5, a housing case 6 that houses these elements, a cabinet 7 that is mounted at the front surface of the liquid crystal display 2, and a stand 8 that supports the housing case 6 from below (see FIG. 1). The liquid crystal display 2 corresponds to the display device according to various preferred embodiments of the present invention and preferably includes a backlight apparatus 3 (corresponding to the illumination apparatus for a display device of the present invention) and a display panel 4 that is disposed at the front thereof and can display images (corresponding to the display of the present invention) (see FIG. 2).

Figure 2:
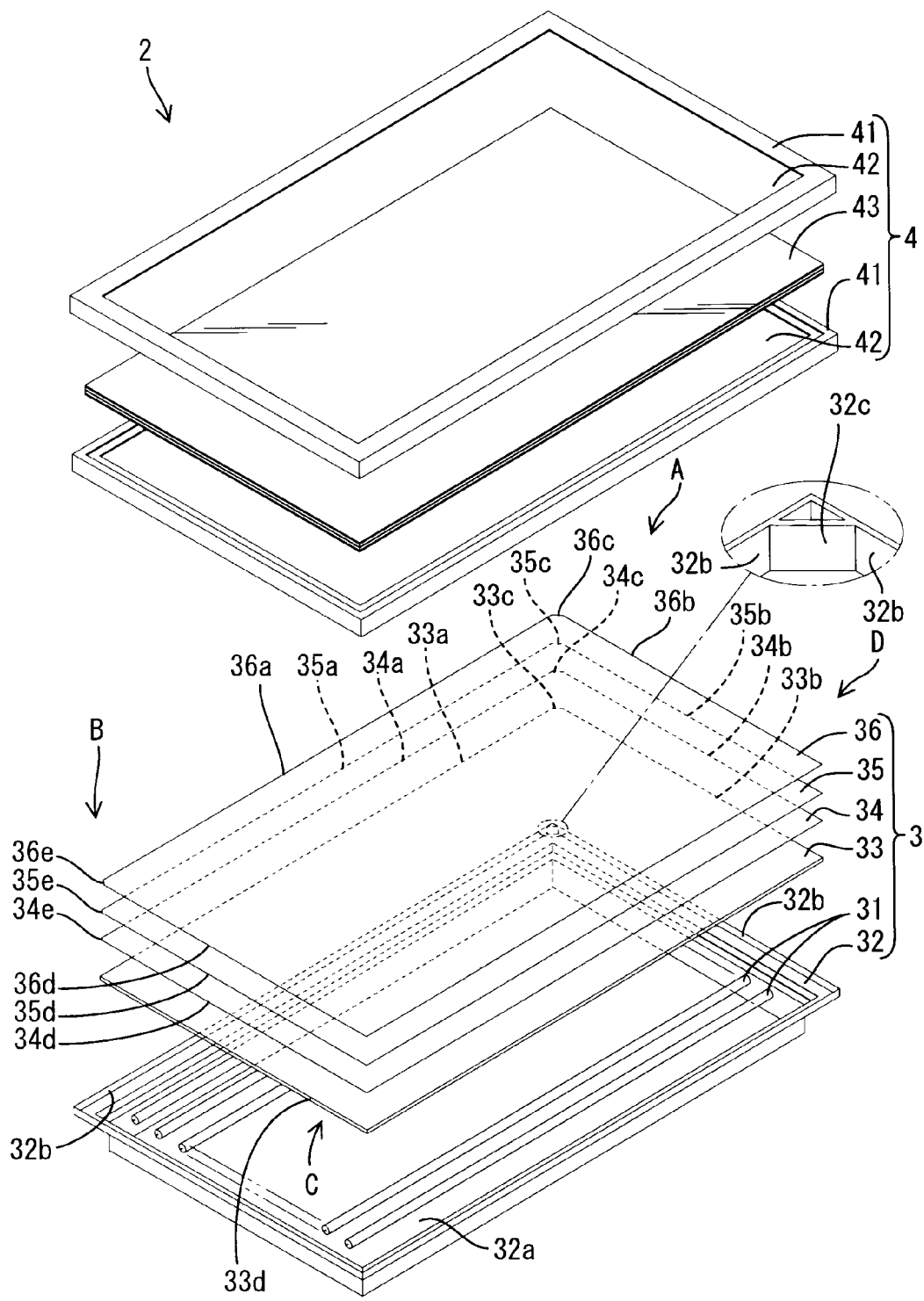
FIG. 2 is an exploded perspective view of a liquid crystal display shown in FIG. 1.
Figure 3:
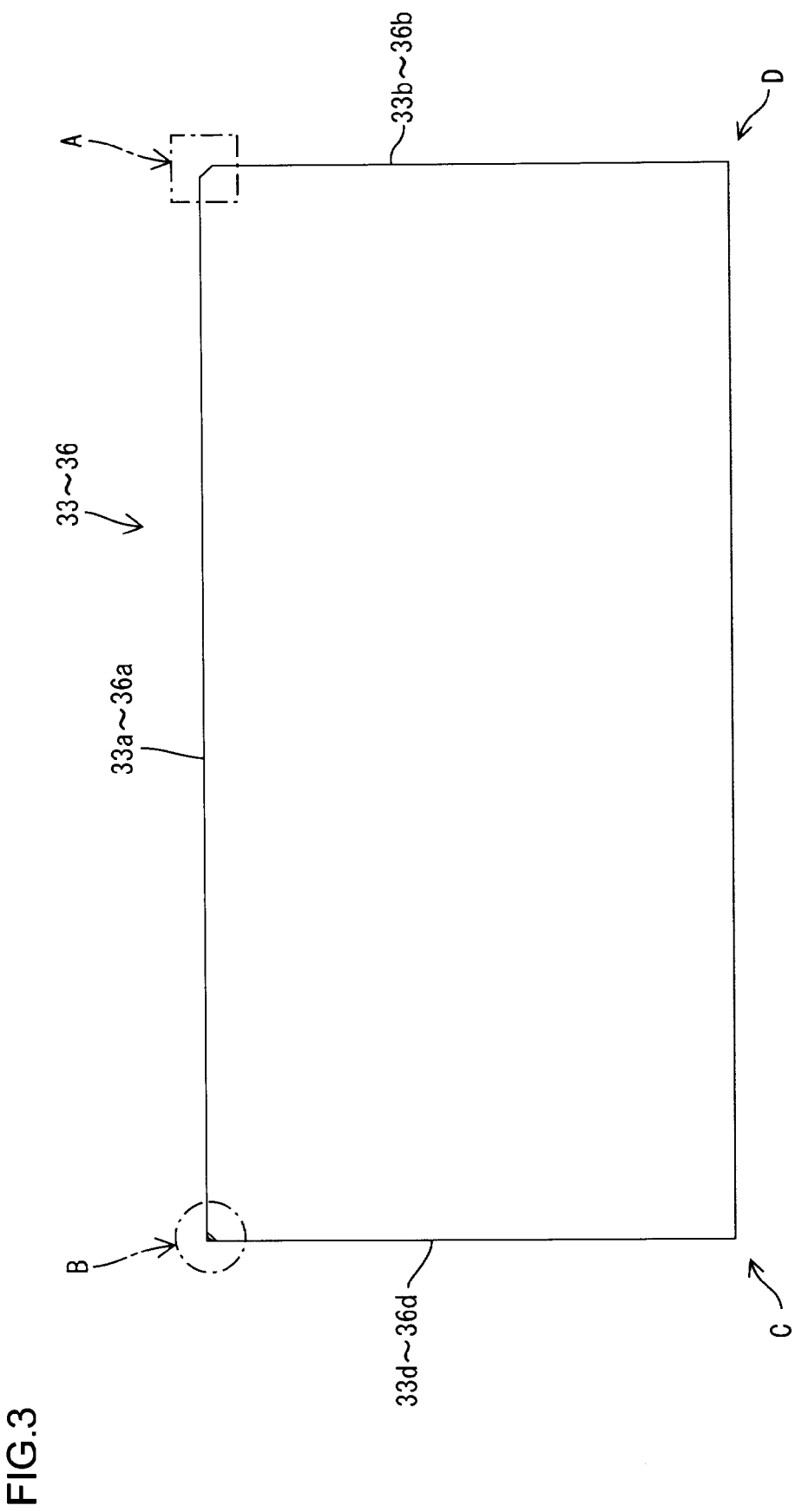
FIG. 3 is a plan view of an optical sheet shown in FIG. 1.
Figure 4A:
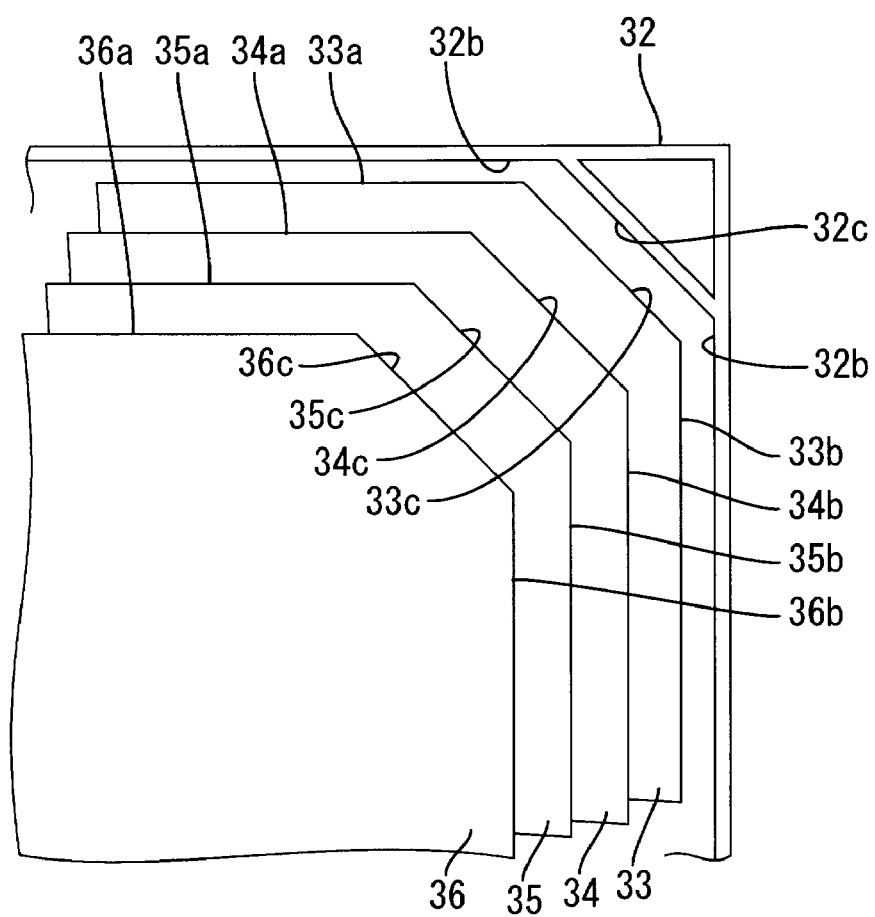
FIG. 4A is an exploded plan view of a state before sheet inversion detection portions of optical sheets are housed in a tray.
Figure 4B:
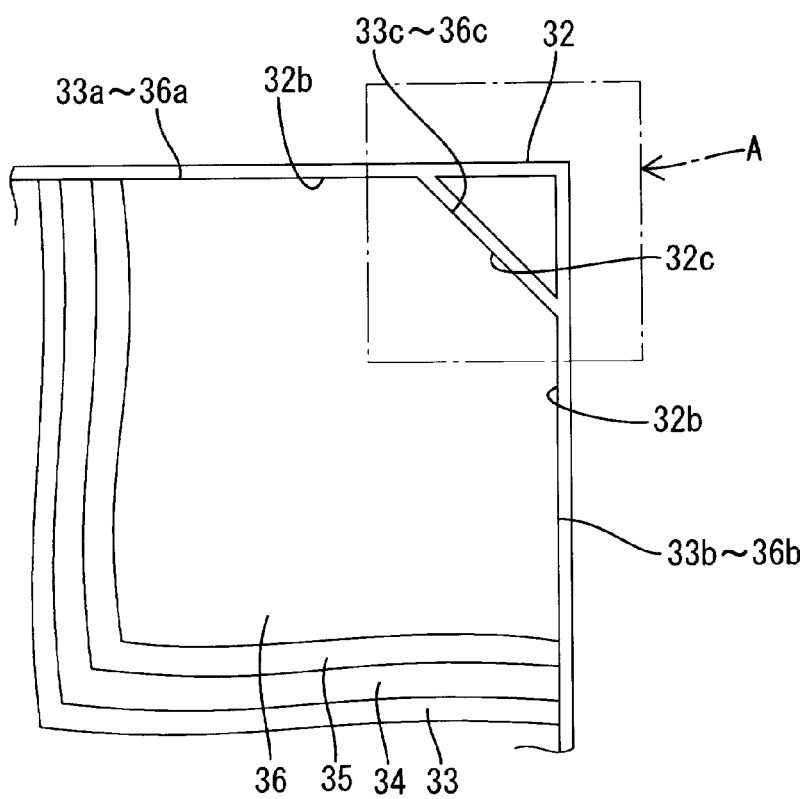
FIG. 4B is an enlarged plan view showing a state when sheet inversion detection portions of the optical sheets are housed in the tray.

The display panel 4 preferably includes a pair of glass substrates 42 that are fitted inside frames 41, respectively, a pair of transparent electrodes mounted therebetween, and a panel substrate 43 including an orientation film including liquid crystal. The backlight apparatus 3 preferably is an apparatus referred to as a "direct-type backlight apparatus" that includes a tray 32 (corresponding to the housing of the present invention) that houses a plurality of fluorescent lights 31 (corresponding to the light source of the present invention), a light guide plate 33 that is disposed directly above the tray 32, a diffusing sheet 34 that is disposed directly above the light guide plate 33, and two lens sheets 35 and 36 that are disposed above the diffusing sheet 34, although the backlight apparatus is not limited thereto. The light guide plate 33, the diffusing sheet 34, and the lens sheets 35 and 36 are preferably formed of a synthetic resin and correspond to the optical sheets of the present invention. As shown in FIG. 2, because each of these optical sheets has four corner portions, these sheets preferably have a substantially rectangular shape when viewed from above.

As shown in FIG. 2, a reflection sheet 32a is provided inside the tray 32, and the plurality of fluorescent lights 31 are positioned on the reflection sheet 32a. Each fluorescent light 31 is disposed in parallel or substantially in parallel at equal distances inside the tray 32, and preferably have an overall planar shape. The laminated light guide plate 33, diffusing sheet 34, and lens sheets 35 and 36 are arranged such that their peripheries are surrounded inside the tray 32 by a substantially rectangular wall portion 32b thereof so as to receive light from the fluorescent lights 31, and are housed such that their positions are restricted (see FIG. 2, FIG. 4, and FIG. 5).

A tip of one corner portion (denoted by reference character A in FIG. 3) at the same location in the laminated light guide plate 33, the diffusing sheet 34 and the lens sheets 35 and 36, respectively, is formed such that the same amount in a triangular shape is removed therefrom by respective line segments (straight lines forming an approximately 45° angle corresponding to respective two edges 33a and 33b, 34a and 34b, 35a and 35b, and 36a and 36b) 33c, 34c, 35c and 36c extending between two edges 33a and 33b, 34a and 34b, 35a and 35b, and 36a and 36b defining the respective corner portions A. As a result, the respective corner portions A of the light guide plate 33, the diffusing sheet 34 and the lens sheets 35 and 36 have a similar shape to each other and a sheet inversion detection portion is provided at each corner portion A (see FIG. 4A). In this connection, the light guide plate 33, the diffusing sheet 34 and the lens sheets 35 and 36 may be formed by actually cutting the corner portions A of sheet members that initially have a substantially rectangular shape along the respective straight lines 33c, 34c, 35c and 36c, or may be formed in sheets 33, 34, and 36 that are made in a shape in which the tips of the respective corner portions A are removed from the start using a forming die.

At a wall portion 32b of the tray 32 at which the corner portions A of the light guide plate 33, diffusing sheet 34, and lens sheets 35 and 36 are disposed, an opposing surface 32c is arranged along the line segments 33c, 34c, 35c, and 36c of the corner portion A so as to correspond to the shape of the corner portions A from which the tips are removed. The opposing surface 32c restrains the line segments 33c, 34c, 35c, and 36c after the sheets are housed in the tray 32 (see FIG. 4B). In this connection, the opposing surface 32c is not provided at the area of the wall portion 32b at which the other corner portions (corner portions B, C and D, described later) of the light guide plate 33, the diffusing sheet 34, and the lens sheets 35 and 36 are disposed (see FIG. 2 and FIG. 5).

Further, in the diffusing sheet 34 and the lens sheets 35 and 36, respectively, the tip of one corner portion (denoted by representative character B in FIG. 3) among the corner portions other than the corner portion A preferably has a shape in which it is trimmed off by respective second line segments 34e, 35e, 36e that extend between two edges 34a and 34d, 35a and 35d, and 36a and 36d defining the respective corner portions B. The shapes of the second line segments 34e, 35e and 36e are different from each other among the adjoining sheets 34, 35 and 36.

More specifically, with respect to the diffusing sheet 34, the tip of the corner portion B defined by the two edges 34a and 34d has a shape that is trimmed by a straight line (second line segment) 34e that links the two edges 34a and 34d. With respect to the lens sheet 35, the tip of the corner portion B formed by the two edges 35a and 35d has a shape that is trimmed by an arc (second line segment) 35e that protrudes outward and links the two edges 35a and 35d. Further, with respect to the lens sheet 36, the tip of the corner portion B formed by the two edges 36a and 36d has a shape that is trimmed by a straight line (second line segment) 36e that links the two edges 36a and 36d. As a result, a missing sheet detection portion is provided at the corner portion B of the light guide plate 33, the diffusing sheet 34, and the lens sheets 35 and 36 (see FIG. 5).

Figure 5A:
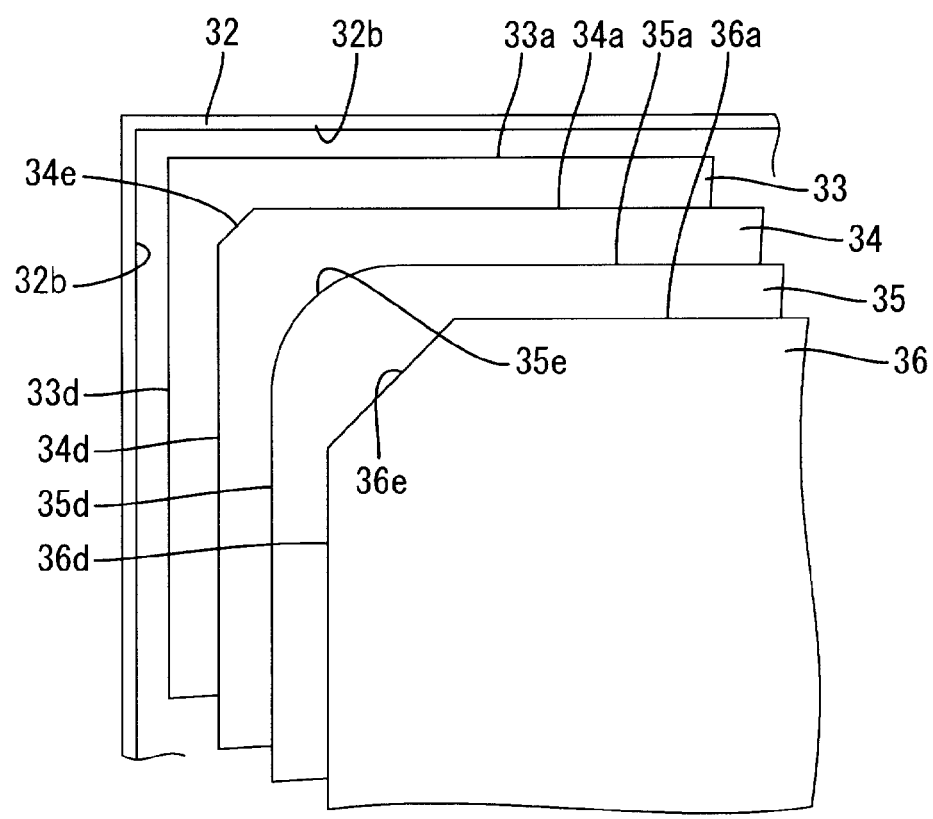
FIG. 5A is an exploded plan view of a state before missing sheet detection portions of optical sheets are housed in a tray.
Figure 5B:
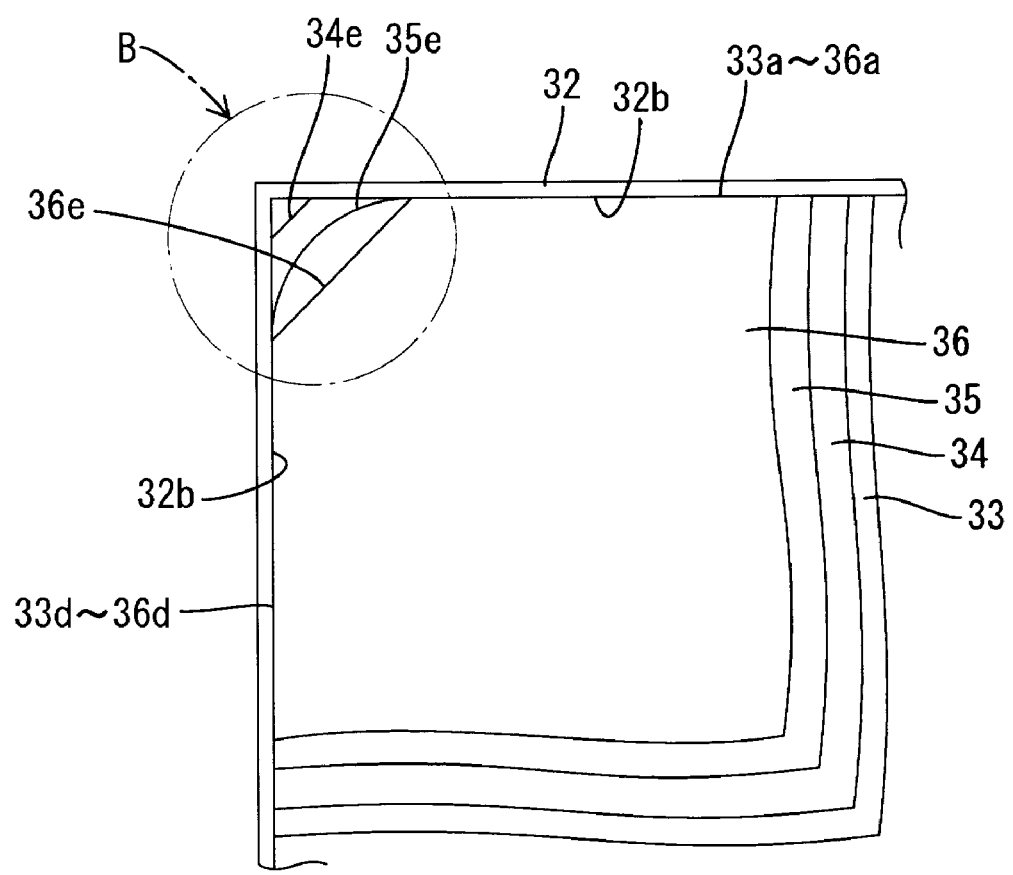
FIG. 5B is an enlarged plan view showing a state when missing sheet detection portions of the optical sheets are housed in the tray.
Figure 6A:
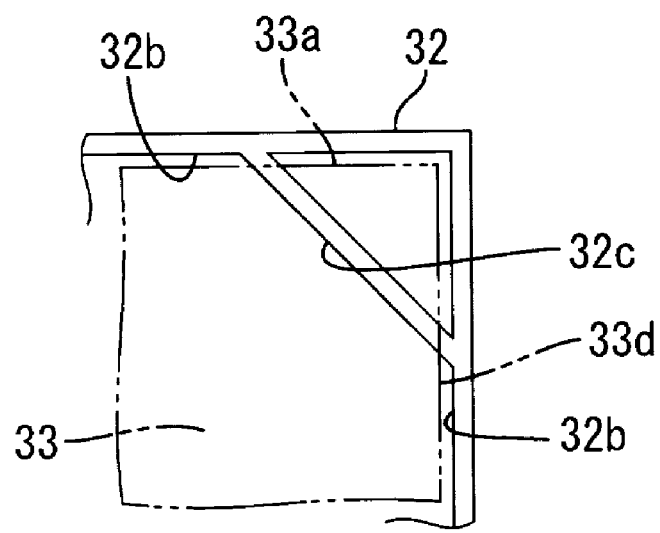
FIG. 6A is an enlarged plan view showing a state when a top surface and a bottom surface of a light guide plate are disposed in an inverted state such that a missing sheet detection portion comes to a standstill on an opposing surface of the tray.
Figure 6B:
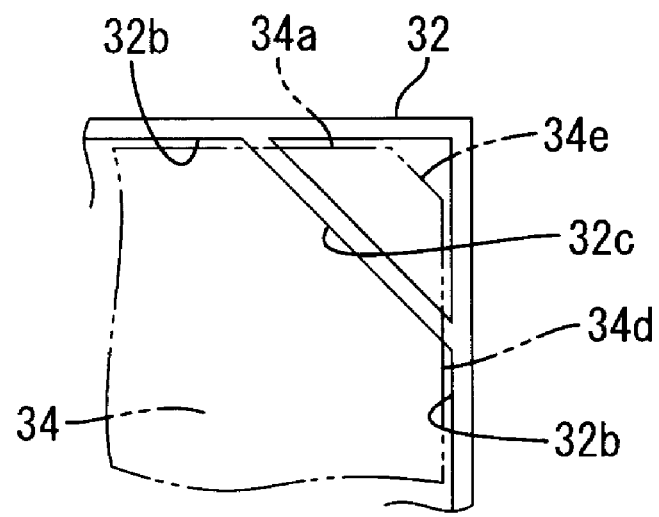
FIG. 6B is an enlarged plan view showing a state when a top surface and a bottom surface of a diffusing sheet are disposed in an inverted state such that a missing sheet detection portion comes to a standstill on an opposing surface of the tray.
Figure 6C:
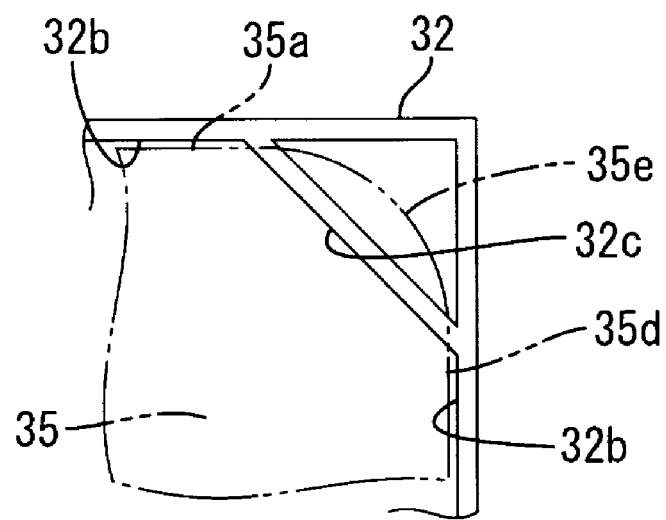
FIG. 6C is an enlarged plan view showing a state when a top surface and a bottom surface of a lens sheet located on the lower side are disposed in an inverted state such that a missing sheet detection portion comes to a standstill on an opposing surface of the tray.
Figure 6D:
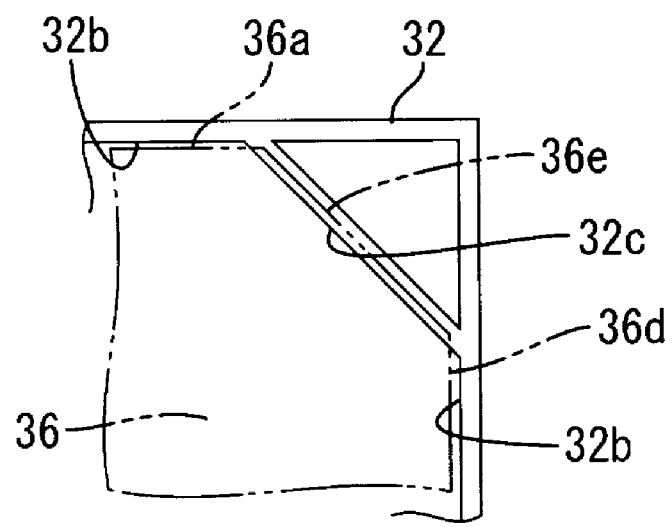
FIG. 6D is an enlarged plan view showing a state when a top surface and a bottom surface of a lens sheet located on the upper side are disposed in an inverted state such that a missing sheet detection portion comes to a standstill on an opposing surface of the tray.
Figure 7:
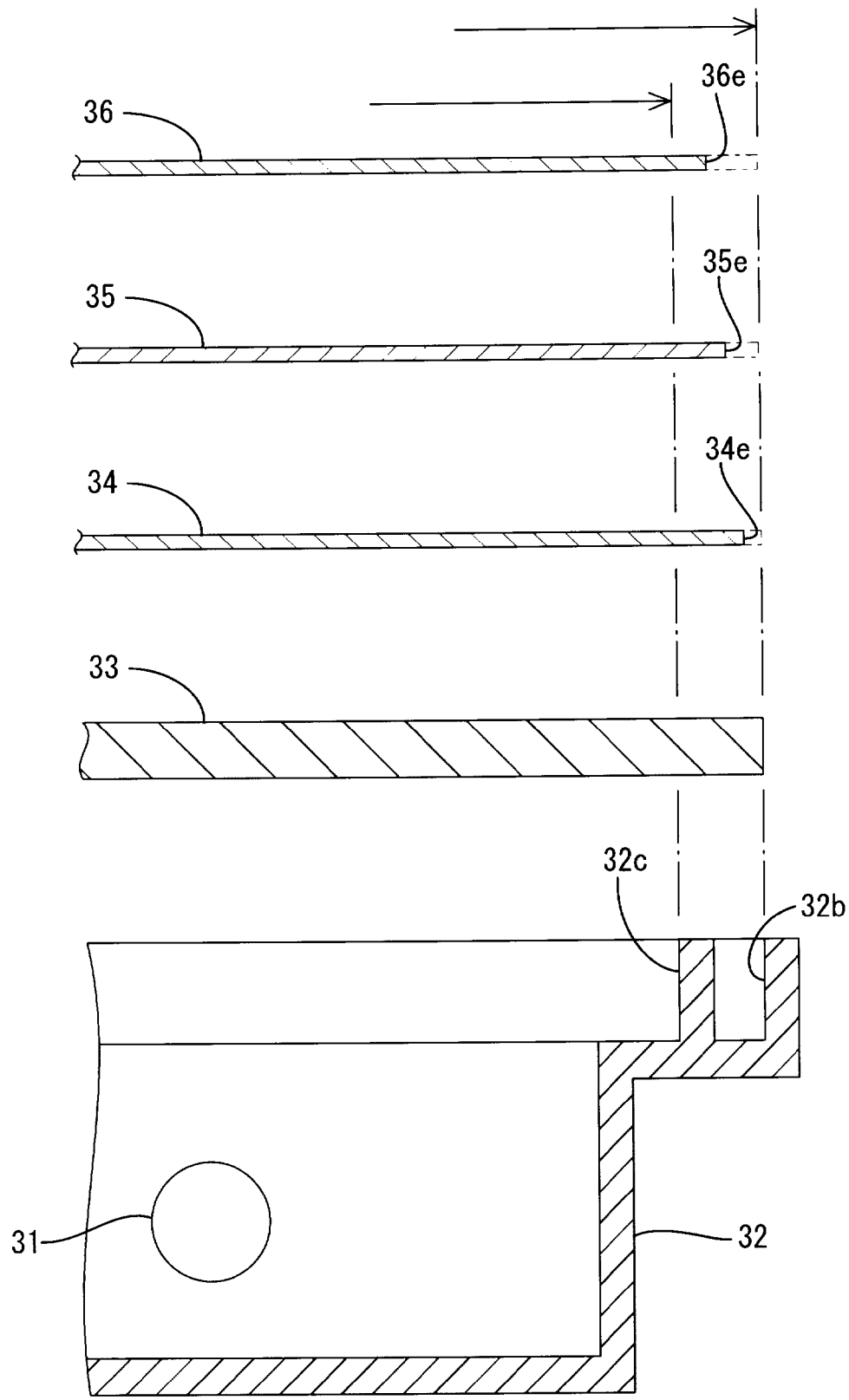
FIG. 7 is an exploded cross-sectional view showing a state when a top surface and a bottom surface of an optical sheet is disposed in an inverted state.

The straight lines 34e and 36e that trim the tips of the corner portions B of the sheets 34 and 36 are arranged so as to form angles of approximately 45° with respect to the two edges 34a and 34d, and 36a and 36d of the sheets 34 and 36, respectively, and the arc 35e that trims the tip of the corner portion B of the sheet 35 preferably has a circumference that is about ¼ the circumference of a circle of a predetermined radius, although the present invention is not limited thereto. As shown in FIG. 5B, the diffusing sheet 34 and the lens sheets 35 and 36 are preferably stacked in the order of sheets with the smallest removed area (in other words, stacked in the order of sheets with the largest remaining area), and the edge portions of the arc 35e of the lens sheet 35 are linked by the straight line 36e of the lens sheet 36 that is stacked thereon. In this connection, the tip of the corner portion B of the light guide plate 33 is not trimmed off.

The area that is trimmed off by the second line segments 34e, 35e, and 36e at the corner portion B of the diffusing sheet 34 and the lens sheets 35 and 36 is smaller than the area that is trimmed off by the line segments 33c, 34c, 35c, and 36c at the corner portion A of the light guide plate 33, the diffusing sheet 34 and the lens sheets 35 and 36. Accordingly, when the corner portion B of each sheet is disposed at the area defined by the opposing surface 32c of the tray 32 where, originally, the corner portion A should be disposed, the corner portions B of the diffusing sheet 34 and the lens sheets 35 and 36 and, naturally, the light guide plate 33 are arranged to come to a standstill on the opposing surface 32c of the tray 32.

The diffusing sheet 34 and the lens sheets 35 and 36 may be formed by actually cutting off the corner portions B of sheet members that initially have a substantially rectangular shape along the respective straight lines 34e and 36e or the arc 35e, or may be formed in sheets 34, 35 and 36 that are made in a shape in which the tips of the respective corner portions B are removed from the start using a forming die. The tips of corner portions C and D (see FIG. 3) of the light guide plate 33, the diffusing sheet 34, and the lens sheets 35 and 36 are not trimmed off in any way.

The light guide plate 33, the diffusing sheet 34, and the lens sheets 35 and 36 are stacked in order from the sheet with the smallest area trimmed off at the corner portion B. The shapes of the second line segments 34e, 35e and 36e between the respective two edges 34a and 34d, 35a and 35d, and 36a and 36d that define the corner portion B of the diffusing sheet 34, and the lens sheets 35 and 36, respectively, differ between adjoining sheets. Therefore, when any sheet among these sheets 33, 34, 35 and 36 that constitute a sheet laminated body is missing, the alignment of the second line segments 34e, 35e and 36e that have different shapes gets out of order, and since this will immediately look strange to a viewer upon visual observation, it is possible to easily distinguish whether the respective sheets 33, 34, 35 and 36 are sufficient or missing (missing sheet detection function).

Further, among the sheets that are adjacent to each other, with respect to sheets 34 and 36, the respective two edges that define the corner portions thereof 34a and 34d, and 36a and 36d are joined by the straight lines 34e and 36e, and with respect to the sheet 35, the two edges 35a and 35d constituting the corner portion B thereof are joined by a curved line (arc 35e). Therefore, since the straight lines 34e and 36e and the curved line 35e are adjacent, it is easy to discover a missing one of the sheets 34, 35 and 36.

Next, a function (sheet inversion detection function) that indicates when the light guide plate 33, the diffusing sheet 34, or the lens sheets 35 and 36 are disposed in an inverted condition will be described based on FIGS. 6A-6D and FIG. 7. When any member of the group including the light guide plate 33, the diffusing sheet 34, and the lens sheets 35 and 36 is disposed inside the tray 32 in a condition in which the top surface and the bottom surface thereof are in an upside-down state (inverted), the corner portion B or D of that inverted sheet will be mounted on an area at which the opposing surface 32c of the tray 32 is located where, originally, the corner portion A should be disposed. When the corner portion B is mounted on the area where the opposing surface 32c of the tray 32 is located, as shown in FIG. 6, the corner portion B of the inverted light guide plate 33, diffusing sheet 34, or lens sheet 35 or 36 comes to a standstill on the opposing surface 32c of the tray 32, and by visually observing this state, it is discovered that the sheet in question is inverted. Further, when any member of the group including the light guide plate 33, the diffusing sheet 34, and the lens sheets 35 and 36 is inverted and the corner portion D thereof is mounted on an area at which the opposing surface 32c of the tray 32 is located, the corner portion D, from which the tip has not been removed, comes to a standstill on the opposing surface 32c of the tray 32.

According to the present preferred embodiment, the tips of the corner portions A of the light guide plate 33, the diffusing sheet 34, and the lens sheets 35 and 36 are preferably shaped such that they are trimmed off by line segments 33c, 34c, 35c and 36c that extend between the two edges 33a and 33b, 34a and 34b, 35a and 35b, and 36a and 36b that define the respective corner portions. Further, in the wall portion 32b of the tray 32, an opposing surface 32c is arranged along the line segments 33c, 34c, 35c and 36c of the corner portions A so as to correspond to the shape of the corner portions A from which the tips are trimmed off. Therefore, since the configuration adopted is such that, when the light guide plate 33, the diffusing sheet 34, or the lens sheets 35 and 36 are housed in the tray 32 in a condition in which the top surface and the bottom surface thereof are in an inverted state, (the tip of) another corner portion B or D comes to a standstill on the opposing surface 32c, it can be easily discovered that the light guide plate 33, the diffusing sheet 34, or the lens sheet 35 or 36 is disposed in an upside-down condition. Further, since the configuration is one in which only the tip of the corner portion A of the light guide plate 33, the diffusing sheet 34, and the lens sheets 35 and 36 is trimmed off, it is possible to make the backlight apparatus 3 small without sacrificing the active area of the light guide plate 33, the diffusing sheet 34, and the lens sheets 35 and 36.

Furthermore, the configuration adopted is one in which, when the light guide plate 33, the diffusing sheet 34, and the lens sheets 35 and 36 are laminated and housed in the tray 32 such that a sheet inversion detection portion is located at the corner portions A of the light guide plate 33, the diffusing sheet 34, and the lens sheets 35 and 36 and a missing sheet detection portion is located at the other corner portions B, the missing sheet detection portion comes to a standstill on the opposing surface 32c of the tray 32 when the light guide plate 33, the diffusing sheet 34, or the lens sheets 35 or 36 is housed in the tray 32 in a condition in which the top surface and the bottom surface thereof are inverted. It is therefore possible to easily discover, via the sheet inversion detection portion, that the light guide plate 33, the diffusing sheet 34, or the lens sheet 35 or 36 is disposed in an upside-down condition. It is also easy to discover, via the missing sheet detection portion, that there is a missing item among the light guide plate 33, the diffusing sheet 34, and the lens sheets 35 and 36. Furthermore, by adopting a configuration in which the display panel 4 is disposed in front of the backlight apparatus 3, it is possible to make a small liquid crystal display 2 and television receiver apparatus 1 in which it can be easily discovered that the light guide plate 33, the diffusing sheet 34, or the lens sheets 35 and 36 is disposed in an upside-down condition.

Modification Examples

Next, modification examples of preferred embodiments of the present invention will be described referring to FIGS. 8A-8F. In the figures, a square formed by alternate long and short dashed lines represents a corner portion at which a sheet inversion detection portion is disposed and, likewise, a circle formed by alternate long and short dashed lines represents a corner portion at which a missing sheet detection portion is disposed. In modification example 1 shown in FIG. 8A, among the four corner portions of the light guide plate 33, the diffusing sheet 34, and the lens sheets 35 and 36, a pair of sheet inversion detection portions are provided at diagonally opposing corner portions, and a missing sheet detection portion is disposed at one of the remaining corner portions.

Figure 8A:
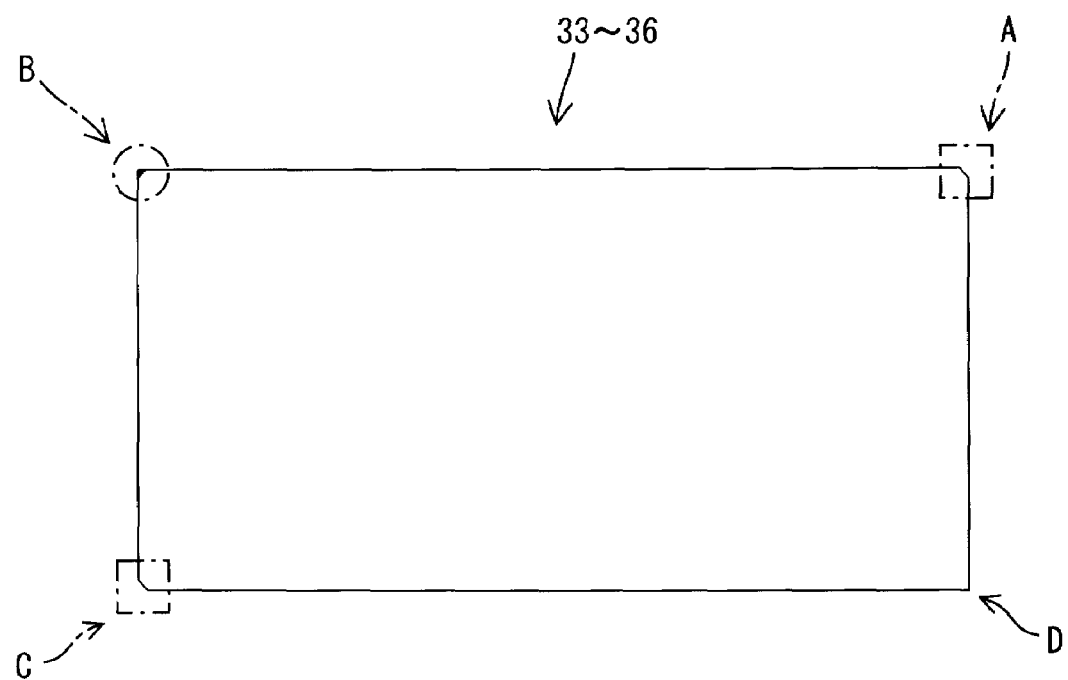
FIG. 8A is a plan view of an optical sheet according to modification example 1 of a preferred embodiment of the present invention.
Figure 8B:
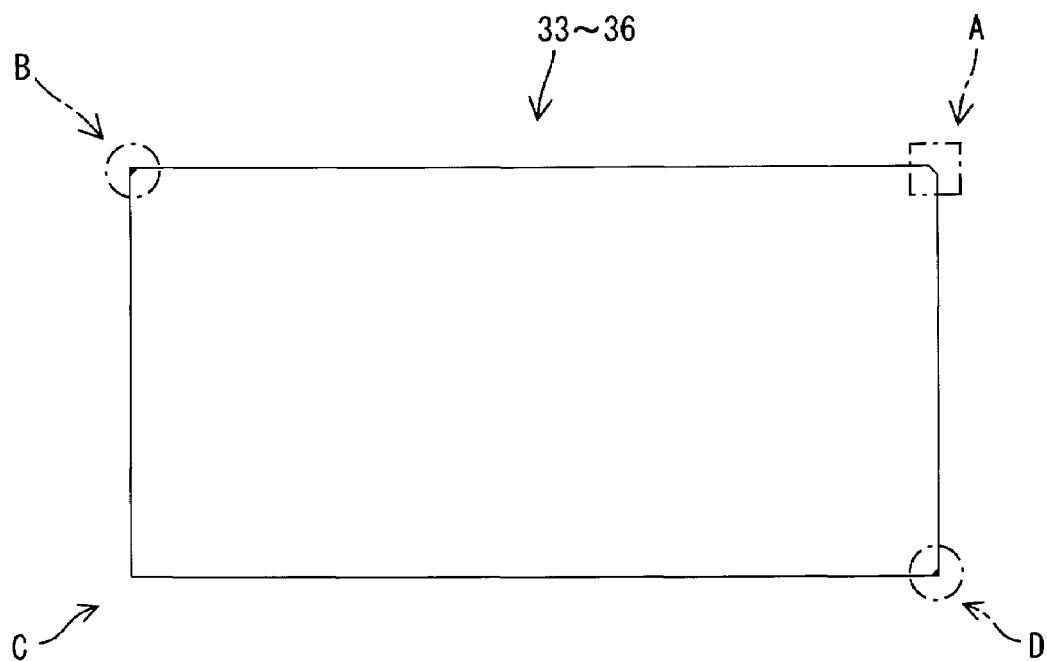
FIG. 8B is a plan view of an optical sheet according to modification example 2 of a preferred embodiment of the present invention.

In modification example 2 shown in FIG. 8B, among the four corner portions of the light guide plate 33, the diffusing sheet 34, and the lens sheets 35 and 36, a pair of missing sheet detection portions are disposed at diagonally opposing corner portions, and a sheet inversion detection portion is disposed at one of the remaining corner portions.

Figure 8C:
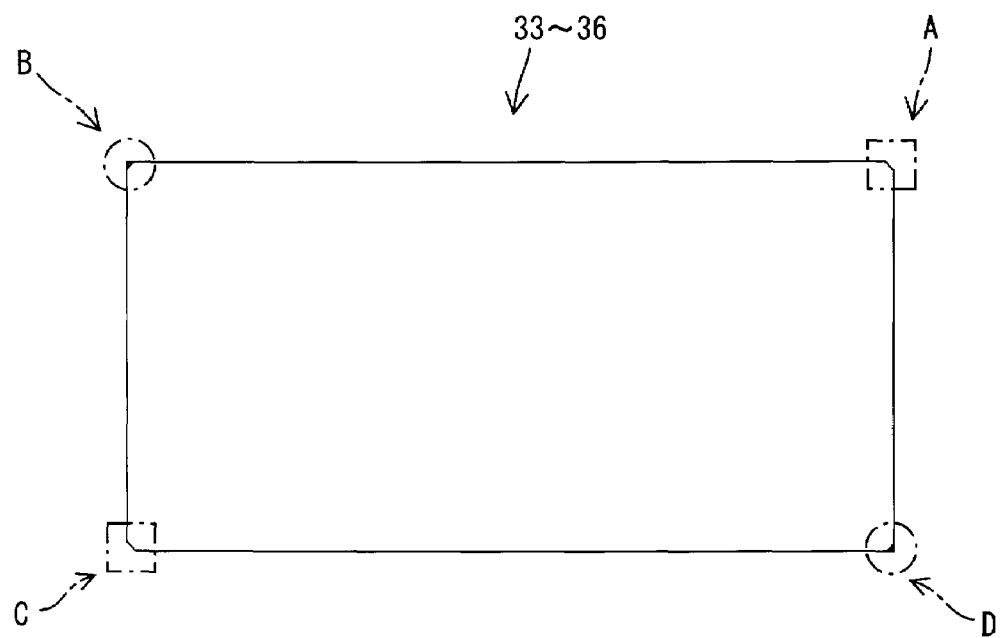
FIG. 8C is a plan view of an optical sheet according to modification example 3 of a preferred embodiment of the present invention.

In modification example 3 shown in FIG. 8C, among the four corner portions of the light guide plate 33, the diffusing sheet 34, and the lens sheets 35 and 36, a pair of sheet inversion detection portions are disposed at diagonally opposing corner portions, and a pair of missing sheet detection portions are disposed at the remaining corner portions. By adopting this configuration, by checking the corner portions at a minimum of two adjacent positions, it is possible to discover if the light guide plate 33, the diffusing sheet 34, or the lens sheet 35 or 36 is disposed in an upside-down condition or is missing, and furthermore, these checks can be easily carried out in a short time.

Figure 8D:
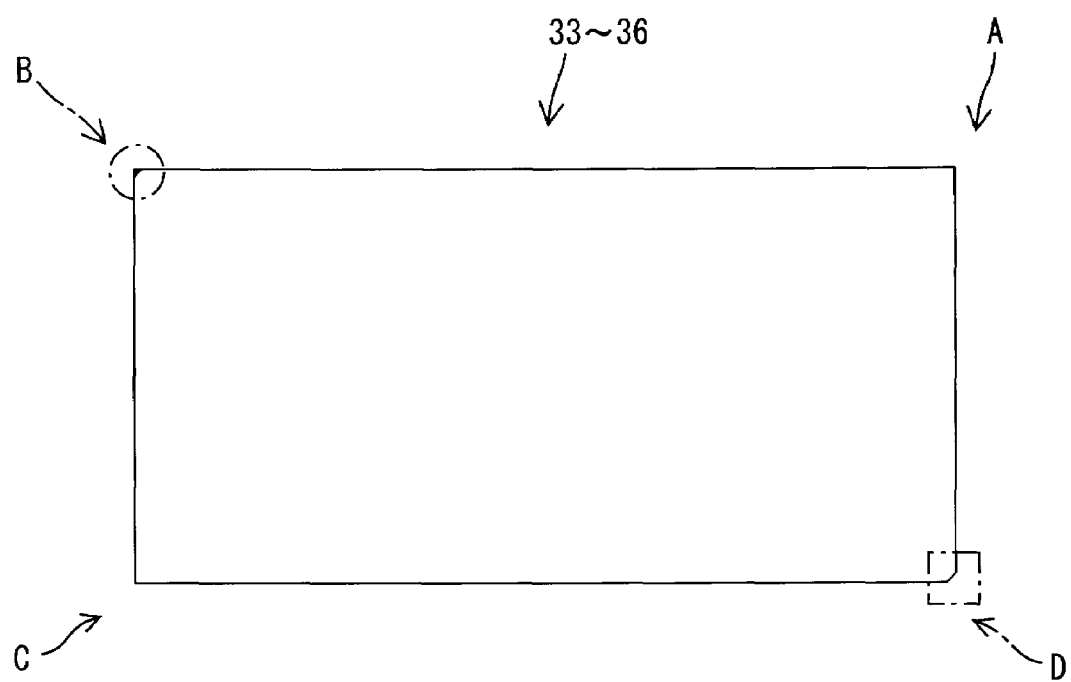
FIG. 8D is a plan view of an optical sheet according to modification example 4 of a preferred embodiment of the present invention.

In modification example 4 shown in FIG. 8D, among the four corner portions of the light guide plate 33, the diffusing sheet 34, and the lens sheets 35 and 36, a single sheet inversion detection portion and a single missing sheet detection portion are disposed at diagonally opposing corner portions.

Figure 8E:
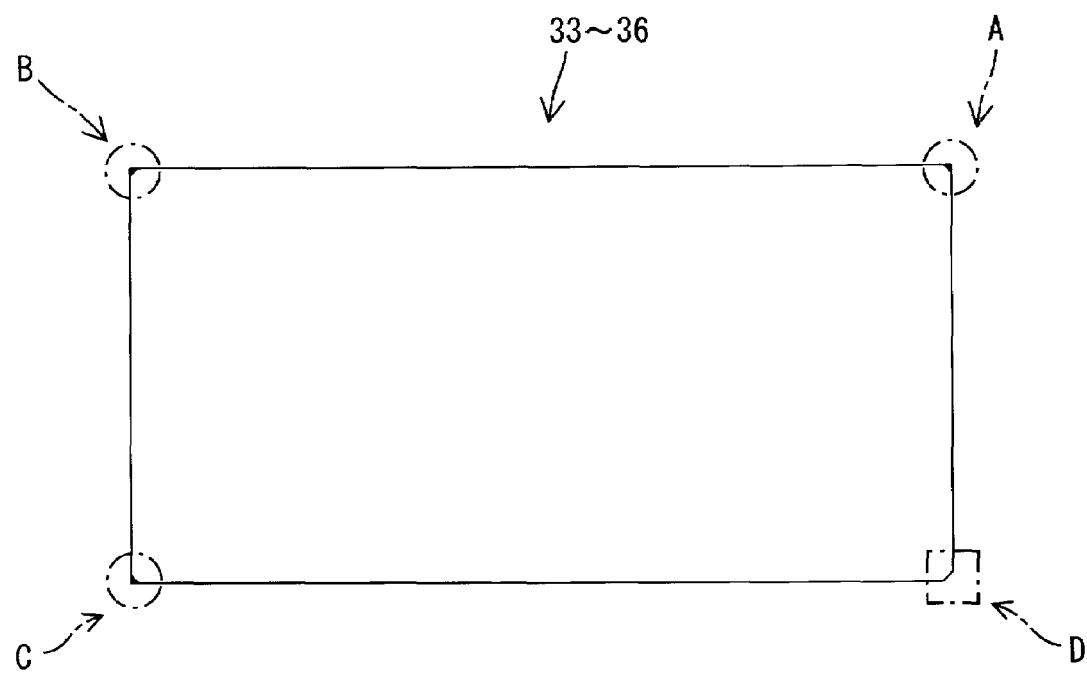
FIG. 8E is a plan view of an optical sheet according to modification example 5 of a preferred embodiment of the present invention.

In modification example 5 shown in FIG. 8E, missing sheet detection portions are disposed at three of the corner portions among the four corner portions of the light guide plate 33, the diffusing sheet 34, and the lens sheets 35 and 36, and a sheet inversion detection portion is disposed at the remaining corner portion.

Figure 8F:
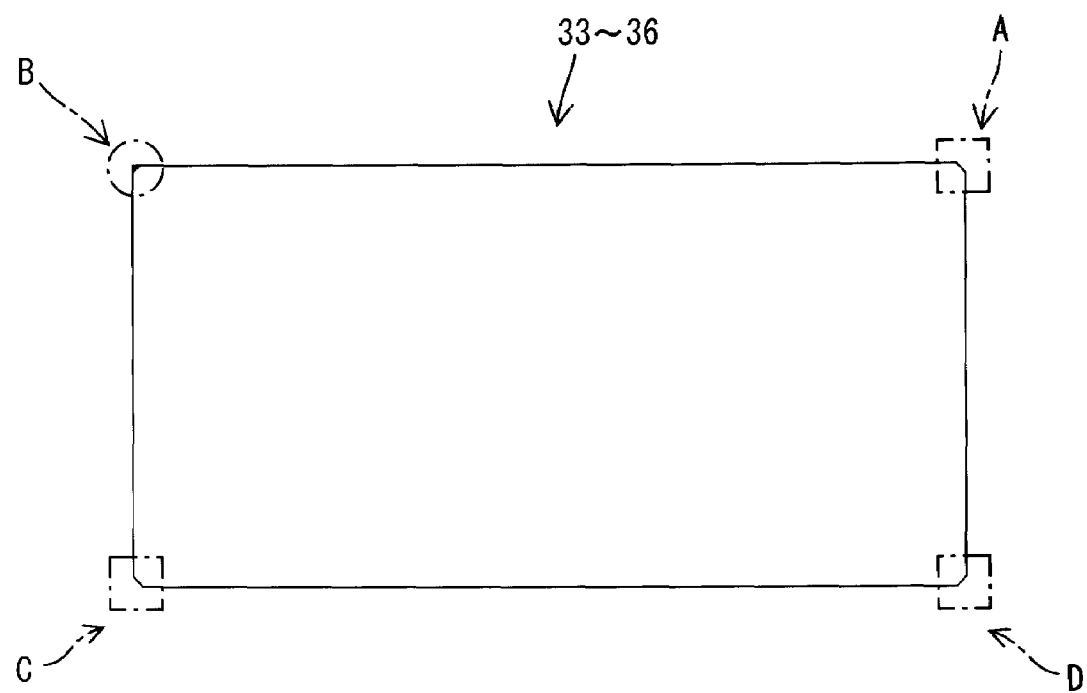
FIG. 8F is a plan view of an optical sheet according to modification example 6 of a preferred embodiment of the present invention.

In modification example 6 shown in FIG. 8F, sheet inversion detection portions are disposed at three of the corner portions among the four corner portions of the light guide plate 33, the diffusing sheet 34, and the lens sheets 35 and 36, and a missing sheet detection portion is disposed at the remaining single corner portion.

Further, in the above described modification examples 1 to 6, naturally the opposing surface 32c is disposed at the area of the wall portion 32b of the tray 32 at which the sheet inversion detection portion of the light guide plate 33, diffusing sheet 34, and the lens sheets 35 and 36 should originally be disposed.

The sheet inversion detection function relating to the above modification examples is the same as that of the above described preferred embodiments, and a description thereof is thus omitted.

Other Preferred Embodiments

The present invention is not limited to the preferred embodiments described by the foregoing description and drawings. For example, the following preferred embodiments are also included in the technical scope of the present invention.

(1) The optical sheets of the present invention include every kind of light control sheet, such as a reflection sheet.

(2) The backlight apparatus according to the present invention is also applicable to a display device other than a device that displays using liquid crystal, such as a plasma display device or other type of display device.

(3) The backlight apparatus according to the present invention is also applicable to a side-light type backlight.

(4) A cold-cathode tube, a hot-cathode tube, and an electric discharge lamp can also be use as the light source of the backlight apparatus.

(5) A curved line may also be used for a line segment that is formed at a sheet inversion detection portion.

(6) A curved line other than an arc or a straight line for which an angle with respect to an outer edge of a sheet is other than 45° may also be applied for a line segment that is formed at a missing sheet detection portion.

(7) The corner portions of the optical sheets may be configured by only a sheet inversion detection portion and corner portions from which the tips are not trimmed off, without forming a missing sheet detection portion.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A lighting device for a display device comprising:
    a tray;
    a light source disposed inside the tray; and
    an optical sheet that has a plurality of corner portions and that is housed inside the tray such that the optical sheet receives light from the light source inside the tray; wherein
    the optical sheet has a first corner portion trimmed by a line segment extending between two edges that define the corner portion and a second corner portion untrimmed, at the corner of the tray a wall is disposed along the line segment of the corner portion of the optical sheet which has been trimmed, and when the optical sheet is housed in the tray in a state in which a top surface and a bottom surface thereof are inverted, the second corner portion comes to a standstill on the wall.

2. A lighting device for a display device as in claim 1, wherein the optical sheet has a substantially rectangular shape.

3. A lighting device for a display device as in claim 2, wherein at least one of the corner portions of the optical sheet has a shape obtained by removing a triangular part having a vertex at an apex of the corner portion from a rectangular shape of the optical sheet.

4. A lighting device for a display device as in claim 1, wherein the tray surrounds the periphery of the optical sheet and restricts the position of the optical sheet.

5. A display device comprising a display panel set up on a lighting device for a display device according to claim 1.

6. A television receiver apparatus comprising a display device according to claim 5.

* * * * *